(12) United States Patent
Alhorn et al.

(10) Patent No.: US 6,246,228 B1
(45) Date of Patent: Jun. 12, 2001

(54) NON-CONTACT LINEAR ACTUATOR POSITION SENSOR HAVING A PID-COMPENSATING CONTROLLER

(75) Inventors: Dean C. Alhorn, Huntsville; David E. Howard, Hazel Green, both of AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/209,363

(22) Filed: Nov. 27, 1998

(51) Int. Cl.⁷ .............................. G01B 7/14; G01B 1/06; G01R 33/025
(52) U.S. Cl. .............................. 324/207.12; 324/207.17; 318/653
(58) Field of Search ..................... 324/207.17, 207.12, 324/207.19; 318/633, 956

(56) References Cited

U.S. PATENT DOCUMENTS 2,980,837 * 4/1961 Wu ........................................ 318/653
4,251,762 * 2/1981 Williams .............................. 318/653

\* cited by examiner

Primary Examiner—Walter E. Snow
(74) Attorney, Agent, or Firm—James J. McGroary (57) ABSTRACT

A position sensor or controller generates a response signal in existing armature windings of an actuator and detects the response signal to determine the position of the armature. To generate the response signal, the actuator includes a sensor excitation winding near the armature. Two sensor excitation windings can be provided, above and below the armature, to cancel out z components and thus allow for a variable gap. The sensor excitation winding or windings are supplied with an excitation signal to induce the response signal in the armature windings. The response signal is derived by differentially amplifying and frequency filtering a raw output of the armature windings. The response signal is demodulated to determine position. If a position controller rather than a mere sensor is desired, the position signal can be buffered, PID compensated, amplified, and fed back to the armature windings.

11 Claims, 5 Drawing Sheets

NON-CONTACT LINEAR ACTUATOR POSITION SENSOR HAVING A PID-COMPENSATING CONTROLLER

ORIGIN OF INVENTION

This invention was made by employees of the United States Government and may be manufactured and used by or for the Government for Governmental purposes without the payment of royalties.

BACKGROUND OF INVENTION

1. Field of Invention

The present invention is directed to a non-contact position sensor and more particularly to a non-contact position sensor for an actuator or for other settings in which an air gap is required to fluctuate.

2. Description of Related Art

It is often desirable to have a non-contact position sensor when closing a servo loop around an actuator. This becomes difficult in many applications where weight and volume are critical because many non-contact position sensors are implemented using optical devices. If an optical device is not used, then a Hall device is usually chosen.

For similar applications, optical devices are usually large and cumbersome to work with and are often impossible to mount without having the sensor become the device which dictates the volume. Optical sensors need a light source, which also requires volume and extra alignment problems.

Hall sensors have the disadvantage of nonlinearity and must be precision mounted to obtain accurate measurement of position. The Hall sensors also need another component, usually a permanent magnet, for use in sensing position. Another disadvantage of Hall devices is their reaction to permanent and fluctuating magnetic fields.

A final disadvantage of Hall devices and the like is that such devices require a fixed air gap in the motor. In some applications, however, it is required that the air gap fluctuate. For example, one type of actuator for which such devices cannot be used is a linear permanent magnet motor, in which the winding is fixed and the permanent magnet is allowed to move.

SUMMARY OF THE INVENTION

It is an object of the invention to develop a non-contact position sensor which requires a minimum of weight and volume.

It is another object of the invention to develop a non-contact position sensor which can be easily implemented with a given actuator, such as a linear permanent magnet motor where the winding is fixed and the permanent magnet is allowed to move.

It is a further object of the invention to develop a non-contact position sensor which uses existing actuator windings.

It is a still further object of the invention to use electronics to develop a very accurate, low volume, low weight non-contact position sensor.

To achieve these and other objects, the present invention is directed to a position sensor for sensing a position of an armature in an actuator, the armature having at least one armature winding, the position sensor comprising: excitation wave generating means for generating an excitation wave; at least one excitation winding for generating an excitation magnetic field from the excitation wave and for applying the excitation magnetic field to at least one armature winding to cause at least one armature winding to generate a response signal; detecting means, connected to at least one armature winding, for detecting the response signal in the armature winding; and demodulating means for determining the position of the armature from the response signal detected by the detecting means.

The present invention is further directed to a position controller for sensing and controlling a position of an armature in an actuator, the armature having at least one armature winding, the position controller comprising a position sensor such as that described above and position controlling means, receiving the detected position signal, for generating a position control signal and outputting the position control signal to the at least one armature winding.

Linear position can be detected in either a single axis or dual axes simultaneously. The design is simplified because the sensor and actuator are co-located (have the same coordinate frame). Only a single component (the excitation windings) needs to be added to existing actuators.

The present invention can be used for vibration isolation for glovebox applications. It can be used for vibration isolation systems using electromagnetic actuators for integrated circuit manufacturing equipment and other sensitive manufacturing machines. It can also be used as a linear position sensor for motors, copiers, antilock brake systems, and the like, and in robotics.

BRIEF DESCRIPTION OF THE DRAWINGS

A preferred embodiment of the invention will be set forth in detail with reference to the drawings, in which.

DETAILED DESCRIPTION OF THE PREFERRED EMBODIMENT

Figures 1A, 1B, 1C:
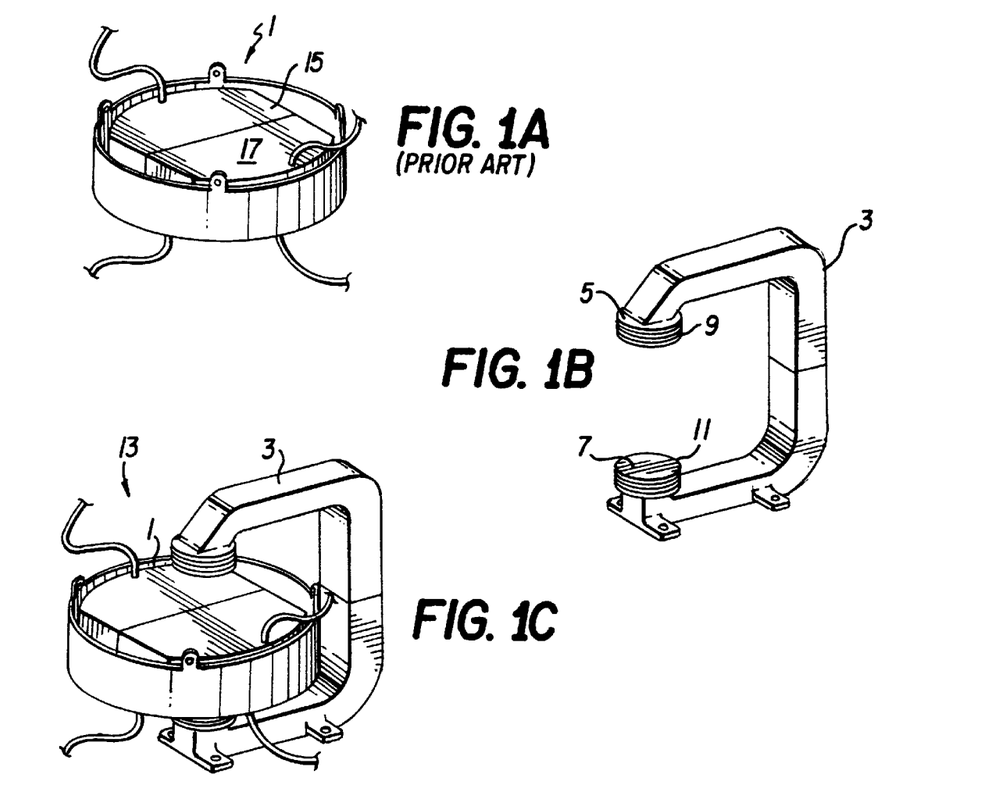
FIGS. 1A–1C show an actuator for use with the position sensor of the present invention.

FIGS. 1A–1C show a non-contact actuator for use with the position sensor of the present invention. The design of this actuator is conventional except for the windings added to the end of each permanent magnet; therefore, other parts of the actuator will not be described in detail. The design of the actuator and the armature is described in U.S. Pat. Nos. 4,833,351 and 4,443,743. Of course, other actuators could be used instead of the one set forth here.

FIG. 1A shows armature 1 of the actuator. FIG. 1B shows permanent magnet bracket 3 of the actuator. Permanent magnet bracket or backiron 3 is formed of permanent magnet portions 5 and 7, which have sensor excitation windings or coils 9 and 11, respectively, disposed on end portions thereof. FIG. 1C shows armature 1 and permanent magnet backiron 3 assembled into actuator 13.

Armature 1 has two sets of wires or windings 15 and 17, which are wound 90° out of phase from each other. This allows actuator 13 to have an x-y movement.

As noted above, windings 9 and 11 are wound around both the top and bottom permanent magnet portions, namely, permanent magnet portions 5 and 7, respectively. As will become more readily apparent below, this winding configuration renders the sensor insensitive to z motions, thus allowing for a variable air gap in the motor. Therefore, the final result is an accurate, low weight, low volume, non-contact x-y position sensor insensitive to z motions.

Figure 2:
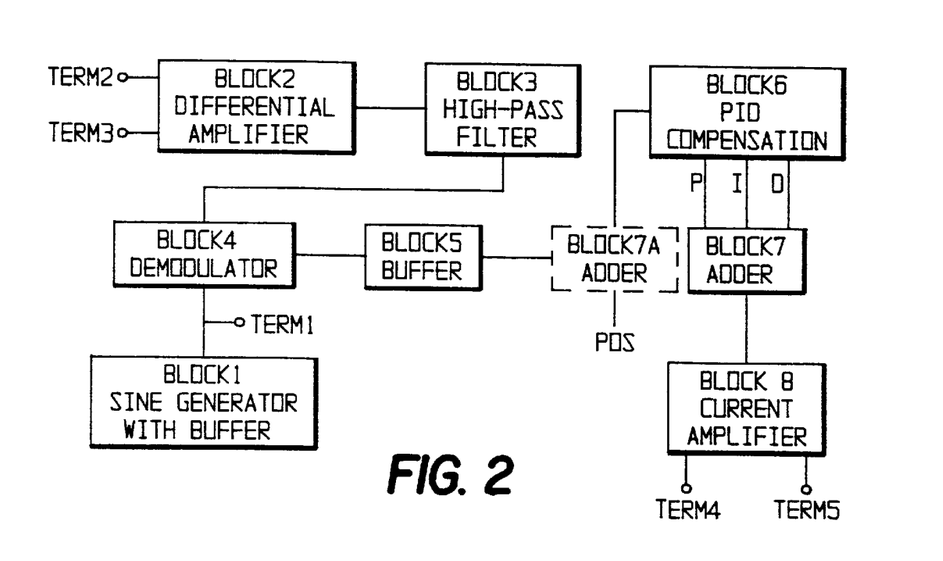
FIG. 2 is a schematic block diagram of the electronics used in the position sensor of the present invention.

FIG. 2 is a schematic block diagram of the electronics used in the position sensor. In FIG. 2, the schematic is blocked into functions purely for ease of explanation. The electronics of the position sensor do not have to be physically provided in the form of these blocks, but instead can be provided in any suitable level of integration, from purely discrete electronic elements to a single integrated circuit or any form of integration in between, and can be implemented in many ways by those skilled in the art who have reviewed this disclosure. First, the functions of the blocks will be set forth; then, one possible circuit configuration for implementing the functions will be set forth in detail.

Sensor excitation windings 9 and 11 are excited with a 20-kilohertz (or other suitable frequency) sine wave excitation signal generated by the sine generator with buffer of BLOCK1 and output through terminal TERM1. In actuator 13, sensor excitation windings 9 and 11 and armature windings 15 and 17 together act as a transformer which transformer-couples the 20-kilohertz sine wave to actuator windings 15 and 17 as the relative displacement between sensor windings 9 and 11 and armature windings 15 and 17 goes back and forth across the range of relative movement. The signal which is transformer coupled to armature windings 15 and 17 is a 20-kilohertz sine wave modulated signal whose amplitude varies with the relative position between permanent magnet portions 5 and 7 and armature windings 15 and 17. Because sensor windings 9 and 11 are provided both above and below armature 1, sensor windings 9 and 11 induce z components which cancel each other out. Thus, the detected position is z-invariant and so is not affected by fluctuations in the air gap.

This modulated signal is retrieved through terminals TERM2 and TERM3 of BLOCK2 and signal-conditioned in BLOCK2, BLOCK3, and BLOCK4. BLOCK2 is a differential amplifier which senses the voltage on armature windings 15 and 17. BLOCK3 is a band-pass or high-pass filter which filters out any low frequencies (e.g., less than 200 hertz) and any high frequencies (e.g., greater than 100 kilohertz) which appear on armature windings 15 and 17. The high frequencies are filtered out for noise purposes, and the low frequencies are filtered because armature windings 15 and 17 also have low-frequency voltages which are associated with the actuator and not the sensor. In fact, a filter can be designed which can pass only the 20-kilohertz excitation frequency. The latter type of filter is better if cost is not an overriding concern, but for demonstration purposes and when cost has to be kept down, the band-pass or high-pass filter of BLOCK3 is sufficient.

BLOCK4 is a demodulator circuit which takes the modulated 20-kilohertz signal and demodulates it, with reference to the same excitation signal output on TERM1, into a DC signal which is directionally sensitive and whose amplitude is proportional to the relative position between permanent magnet portions 5 and 7 and armature windings 15 and 17. The signal developed at the output of BLOCK4 is significant because it represents the system position.

BLOCK5 through BLOCK8 represents the actuator controller. BLOCK5 is simply a high-impedance buffer circuit (with gain equal to one) used to keep the position output of BLOCK4 from getting loaded. BLOCK6 is a proportional-integral-derivative (PID) compensation circuit which develops signal P proportional to position, signal I which is the integral of position, and signal D which is the time derivative of position.

These three signals are summed together using the summer circuit of BLOCK7. The output of BLOCK7 is a PID-compensated position signal which commands the current amplifier of BLOCK8, which outputs signals over terminals TERM4 and TERM5 to drive the actuator.

In this particular arrangement, the signals output from BLOCK8 are input to the same two connections on armature windings 15 and 17 as the two connections going into terminals TERM2 and TERM3 of BLOCK2 which senses position. Thus, the position sensor drives the actuator to a null position. On the other hand, many applications require that a position command be added to the circuit so that the actuator can be controlled to any commanded position. To do this, one simply has to add another adder circuit such as that of BLOCK7 (shown in FIG. 2 as BLOCK7A with a dashed outline) between BLOCK5 and BLOCK6. The adder circuit of BLOCK7A, if used, may include inverters; those skilled in the art who have reviewed this disclosure will readily understand the use and placement of such inverters. The inputs to the adder circuit of BLOCK7A are the output of BLOCK5 and position command POS.

Constructions of BLOCK1 through BLOCK8 will now be described in detail with references to FIGS. 3–6.

Figure 3:
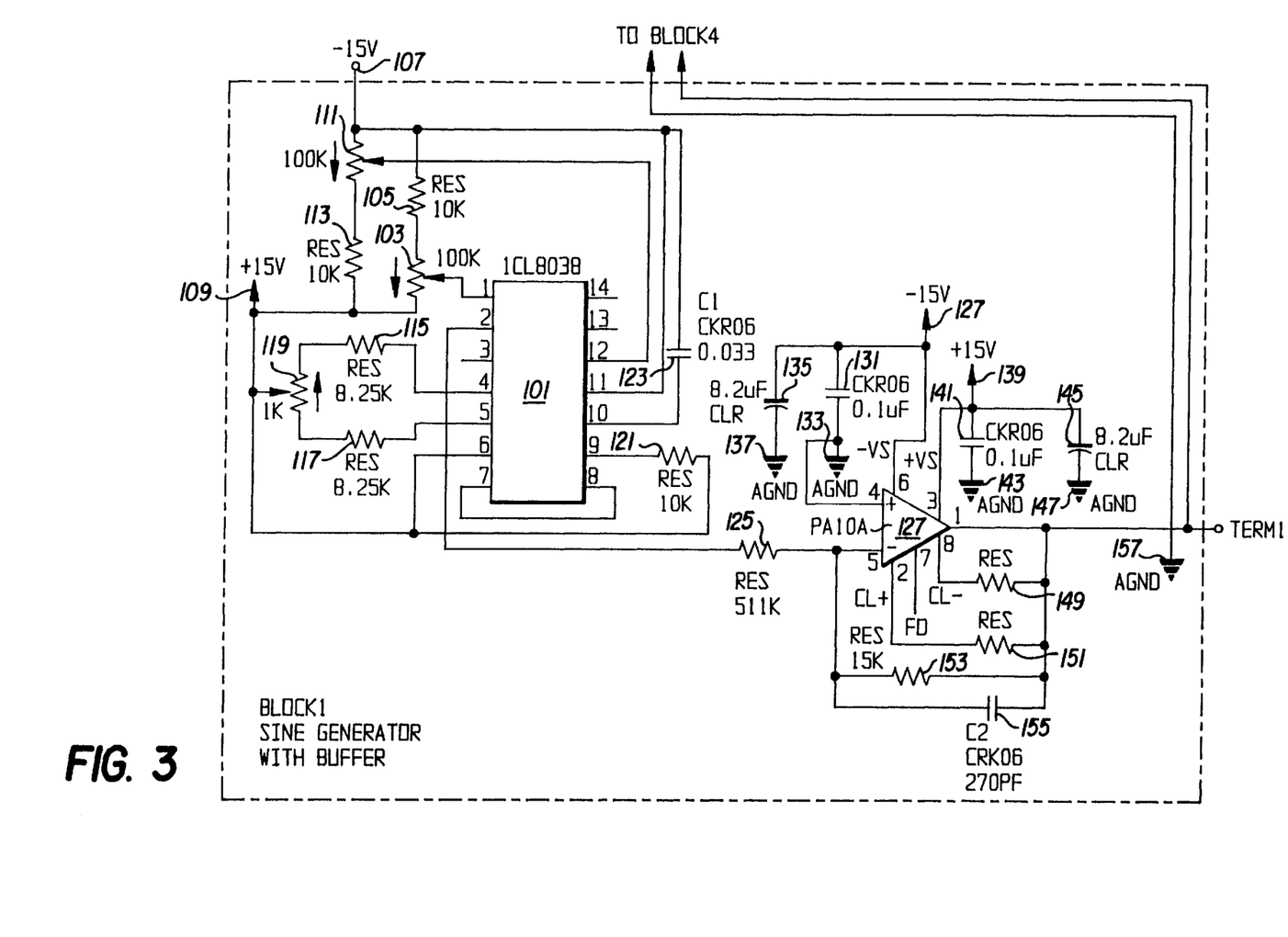
FIG. 3 shows a circuit diagram of the first block of the schematic block diagram of FIG. 2.

FIG. 3 shows one possible construction of BLOCK1. BLOCK1 is based on ICL8038 circuit 101. The first pin of this circuit is connected to the wiper arm of 100K potentiometer 103, which has one terminal connected through 10 kΩ resistor 105 to −15V source 107 and the other terminal connected to +15V source 109. These sources are also connected through 100K potentiometer 111 and 10 kΩ resistor 113. The second pin is used as an output, as will be explained below. The third pin is allowed to float. The fourth and fifth pins are connected through 8.25 kΩ resistors 115, 117 to the terminals of 1K potentiometer 119, whose wiper arm is connected to +15V source 109. The sixth pin is connected to +15V source 109. The seventh and eighth pins are connected to each other. The ninth pin is connected to +15V source 109 through 10 kΩ resistor 121. The tenth pin is connected to −15V source 107 through 0.033 μF capacitor 123, while the eleventh pin is connected to this source directly. The twelfth pin is connected to the wiper arm of potentiometer 111. The thirteenth and fourteenth pins are allowed to float.

The second pin of circuit 101 is connected through 5.11 kΩ resistor 125 to the negative input (fifth pin) of PA10A amplifier 127. The −VS (sixth) pin of amplifier 127 is connected to −15V source 129. This source is also connected through 0.1 μF capacitor 131 to ground 133 and through 8.7 μF capacitor 135 to ground 137. The positive input (fourth pin) is connected between capacitor 1 5 131 and ground 133. +15V source 139 is connected to the +VS (third) pin directectly, through 0.1 μF capacitor 141 to ground 143 and through 8.7 μF capacitor 145 to ground 147. The output from the output (first) pin is the signal output at TERM1. This output is also fed back through resistor 149 to the CL− (eighth) pin, through resistor 151 to the CL+ (second) pin and through 15 kΩ resistor 153 and 270 pF capacitor 155 in parallel to the negative input. The FO (seventh) pin is allowed to float. TERM1 and ground 157 are connected to BLOCK4 in a manner to be described below.

Figure 4:
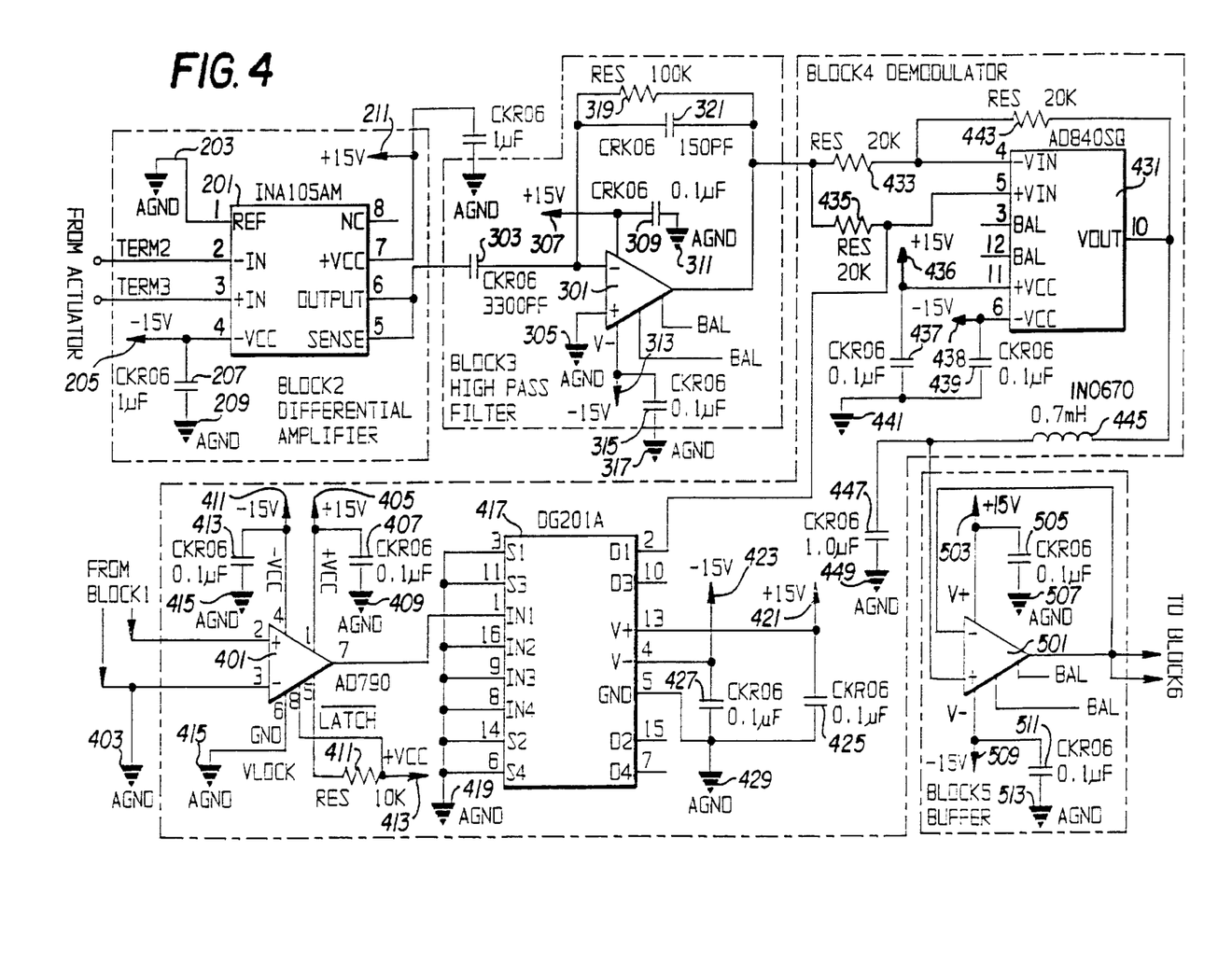
FIG. 4 shows circuit diagrams of the second through fifth blocks of the schematic block diagram of FIG. 2.

FIG. 4 shows possible constructions for BLOCK2, BLOCK3, BLOCK4, and BLOCK 5.

BLOCK2 is based on INA105AM circuit 201. The first (reference) pin of this circuit is connected to ground 203. The second and third (−In and +In) pins receive the inputs from the actuator applied at TERM2 and TERM3. The fourth (−Vcc) pin is connected directly to −15V source 205 and through 1 $\mu$F capacitor 207 to ground 209. The fifth and sixth (Sense and Output) pins are connected to form the output to BLOCK3. The seventh (+Vcc) pin is connected to +15V source 211 and through 1 $\mu$F capacitor 213 to ground 215. The eighth (NC) pin is allowed to float.

BLOCK3 is based on LF356H amplifier 301. The negative input of amplifier 301 receives the output from the fifth and sixth pins of circuit 201 of BLOCK2 through 3300 pF capacitor 303. The positive input of amplifier 301 is connected to ground 305. The V+ pin of amplifier 301 is connected directly to +15V source 307 and through 0.1 $\mu$F capacitor 309 to ground 311. The V− pin of amplifier 301 is connected directly to −15V source 313 and through 0.1 $\mu$F capacitor 315 to ground 317. The BAL pins of amplifier 301 are allowed to float. The output of amplifier 301 is supplied to BLOCK4 in a manner to be described below and is also fed back to the negative input through 100 k$\Omega$ resistor 319 and 150 pF capacitor 321 in parallel.

BLOCK4 includes AD790 amplifier 401. Amplifier 401 receives the output from TERM1 through its positive input (second) pin. The negative input (third) pin is grounded at grounds 157 and 403. The first (+VCC) pin is connected directly to +15V source 405 and through 0.1 $\mu$F capacitor 407 to ground 409. The fourth (−VCC) pin is connected directly to −15V source 411 and through 0.1 $\mu$F capacitor 413 to ground 415. The fifth ($\overline{\text{LATCH}}$) pin is connected through 10 k$\Omega$ resistor 411 through +Vcc source 413, while the Vlogic (eighth) pin is connected directly to source 413. The sixth (GND) pin is connected to ground 415.

The output from the seventh pin of amplifier 401 is applied to the first (IN1) pin of DG201A circuit 417. The IN2-IN4 (sixteenth, ninth, and eighth) pins and the S1-S4 (third, eleventh, fourteenth, and sixth) pins are grounded to ground 419. The D2-D4 (fifteenth, tenth, and seventh) pins are allowed to float. The V+ (thirteenth) pin is connected directly to +15V source 421, while the V− (fourth) pin is connected directly to −15V source 423. Sources 421 and 423 are connected through 0.1 $\mu$F capacitors 425 and 427, respectively, to ground 429. The GND (fifth) pin of circuit 417 is also connected to ground 429.

The output of the second (D1) pin of circuit 417 is used in the next stage of BLOCK4, which is based on AD840SQ circuit 431. Circuit 431 receives, at its fourth (−VIN) pin, the output of amplifier 301 of BLOCK3 through 20 k$\Omega$ resistor 433. The output of amplifier 301 is also passed through 20 k$\Omega$ resistor 435, connected with the output of the D1 pin of circuit 417, and applied to the +VIN (fifth) pin of circuit 431. The third and twelfth (BAL) pins are allowed to float. The eleventh (+VCC) and sixth (−VCC) pins are connected to +15V source 436 and −15V source 438 respectively, and are connected through 0.1 $\mu$F capacitors 437 and 439, respectively, to ground 441. The output from the VOUT (tenth) pin is fed back to the −VIN (fourth) pin through 20 k$\Omega$ resistor 443. This output is also applied to BLOCK5 in a manner to be described below through 0.7 mH inductor 445. Between inductor 445 and BLOCK5, part of the output is picked off and sent through 1.0 $\mu$F capacitor 447 to ground 449.

BLOCK5 is based on LF356H amplifier 501. The output of BLOCK4 is applied to the positive input of amplifier 501. The V+ pin is connected directly to +15V source 503 and through 0.1 $\mu$F capacitor 505 to ground 507. The V− pin is connected directly to −15V source 509 and through 0.1 $\mu$F capacitor 511 to ground 513. The BAL pins are allowed to float. The output is fed back to the negative input and is also supplied to BLOCK6.

Figure 5:
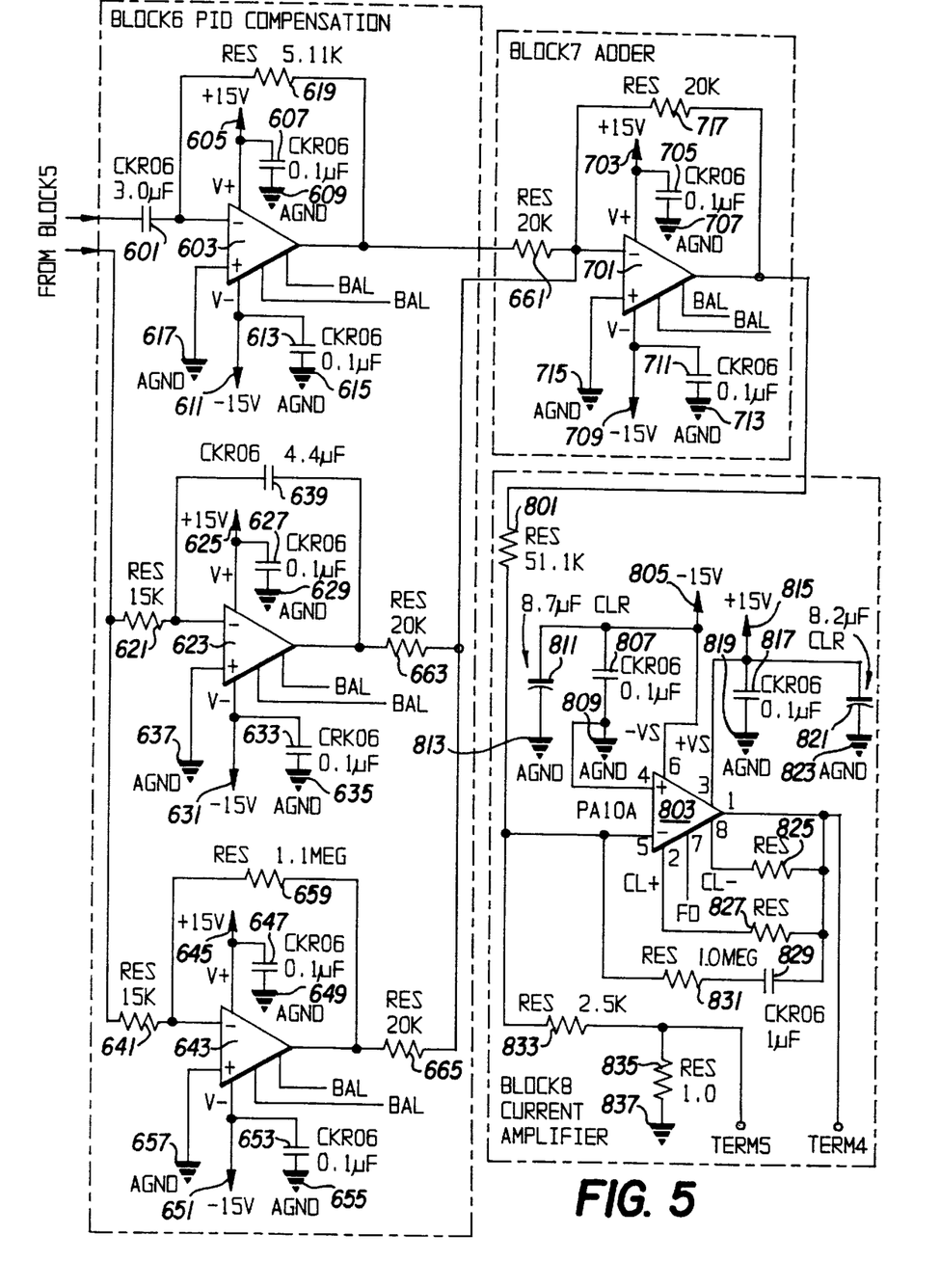
FIG. 5 shows circuit diagrams of the sixth through eighth blocks of the schematic block diagram of FIG. 2.

FIG. 5 shows possible constructions for BLOCK6, BLOCK7, and BLOCK8. If BLOCK7A is used, BLOCK7A can have a construction similar to that shown for BLOCK7.

In BLOCK6, the output of BLOCK5 is split three ways. The output is applied through 3.0 $\mu$F capacitor 601 to the negative input of LF356H amplifier 603. The V+ pin of amplifier 603 is connected directly to +15V source 605 and through 0.1 $\mu$F capacitor 607 to ground 609. The V− pin of amplifier 603 is connected directly to −15V source 611 and through 0.1 $\mu$F capacitor 613 to ground 615. The positive input of amplifier 603 is connected to ground 617. The output of amplifier 603 is fed back to its negative input through 5.11 k$\Omega$ resistor 619. The BAL pins of amplifier 603 are allowed to float.

The output of BLOCK5 is also applied through 15 k$\Omega$ resistor 621 to the negative input of LF356H amplifier 623. The V+ pin of amplifier 623 is connected directly to +15V source 625 and through 0.1 $\mu$F capacitor 627 to ground 629. The V− pin of amplifier 623 is connected directly to −15V source 631 and through 0.1 $\mu$F capacitor 633 to ground 635. The positive input of amplifier 623 is connected to ground 637. The output of amplifier 623 is fed back to its negative input through 4.4 $\mu$F capacitor 639. The BAL pins of amplifier 623 are allowed to float.

The output of BLOCK5 is further applied through 15 k$\Omega$ resistor 641 to the negative input of LF356H amplifier 643. The V+ pin of amplifier 643 is connected directly to +15V source 645 and through 0.1 $\mu$F capacitor 647 to ground 649. The V− pin of amplifier 643 is connected directly to −15V source 651 and through 0.1 $\mu$F capacitor 653 to ground 655. The positive input of amplifier 643 is connected to ground 657. The output of amplifier 643 is fed back to is negative input through 1.1 M$\Omega$ resistor 659. The BAL pins of amplifier 643 are allowed to float.

The outputs of amplifiers 603, 623, and 643 are passed through 20 k$\Omega$ resistors 661, 663, and 665, respectively, and, in BLOCK7, are connected and applied to the negative input of LF356H amplifier 701. The V+ pin of amplifier 701 is connected directly to +15V source 703 and through 0.1 $\mu$F capacitor 705 to ground 707. The V− pin of amplifier 701 is connected directly to −15V source 709 and through 0.1 $\mu$F capacitor 711 to ground 713. The positive input of amplifier 701 is connected to ground 715. The output of amplifier 701 is fed back to its negative input through 20 k$\Omega$ resistor 717. The BAL pins of amplifier 701 are allowed to float.

The output of amplifier 701 is output to BLOCK8. In BLOCK8, this output is connected through 51.5 k$\Omega$ resistor 801 to the negative input (fifth pin) of PA10A amplifier 803. The −VS (sixth) pin of amplifier 803 is connected directly to −15V source 805, through 0.1 $\mu$F capacitor 807 to ground 809, and through 8.7 $\mu$F capacitor 811 to ground 813. The positive input (fourth pin) of amplifier 803 is connected between capacitor 807 and ground 809. The +VS (third) pin of amplifier 803 is connected directly to +15V source 815, through 0.1 $\mu$F capacitor 817 to ground 819, and through 8.7 $\mu$F capacitor 821 to ground 823. The output of the output (first) pin of amplifier 803 is output on TERM4. The output is also fed back through resistor 825 to the CL− (eighth) pin of amplifier 803, through resistor 827 to the CL+ (second) pin of amplifier 803 and through 1 $\mu$F capacitor 829 and 1.0 M$\Omega$ resistor 831 to the negative input of amplifier 803.

TERM5 is connected through 2.5 kΩ resistor 833 to the output of BLOCK7 which has passed through resistor 801 and is also connected through 1.0 Ω resistor 835 to ground 837. The FO (seventh) pin of amplifier 803 is allowed to float.

As noted above, armature 1 has two sets of windings 15 and 17, one for each axis. To control both sets of windings, it is necessary to implement the circuit of FIG. 2 for each axis. However, a single set of excitation windings 9 and 11 on permanent magnet bracket 3 suffices for both axes. Thus, with a single set of windings 9 and 11, the x and y positions can be sensed and fed back to control these positions.

Figure 6A:
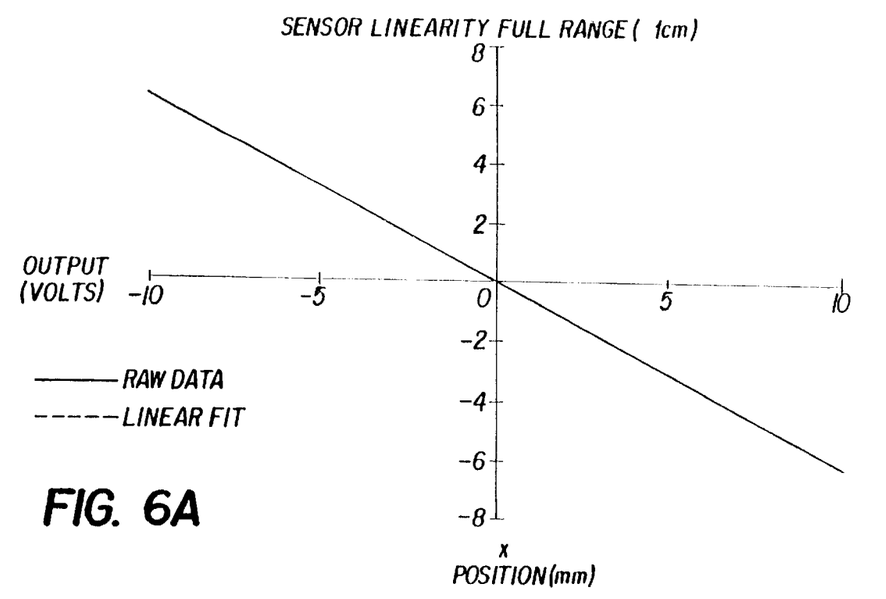
FIGS. 6A and 6B show graphs of sensor linearity.
Figure 6B:
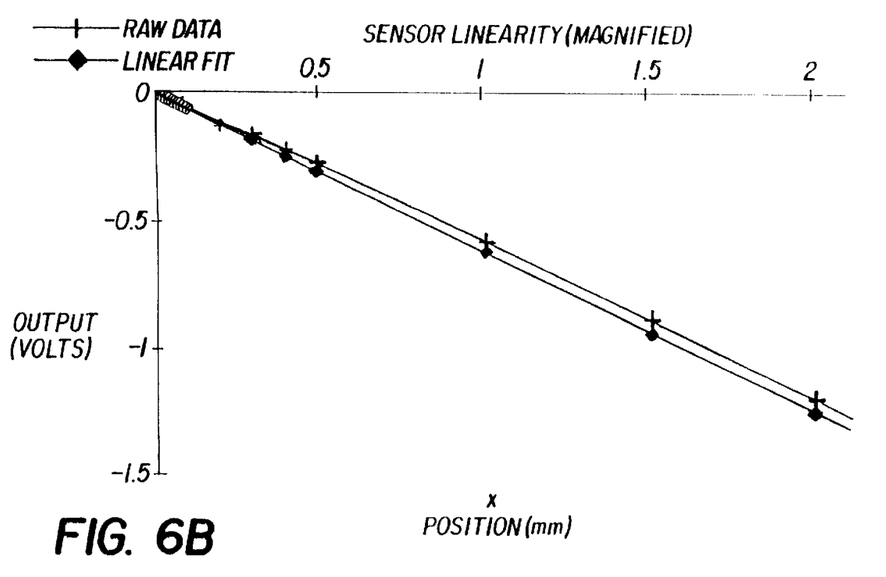

FIGS. 6A and 6B are graphs of data showing the linearity of the sensor according to the present invention. FIG. 6A shows the sensor linearity in the full range of movement of one embodiment, namely, ±1 cm (±10 mm). FIG. 6B is a magnification of the portion of the graph of FIG. 6A for position values between 0 and ±2 mm. As can be seen, the raw data and the linear fit are nearly identical.

The sensor according to the present invention has several advantages over the previous techniques used for non-contact position sensing. First, the sensor is highly linear over the normal operating range of ±1 cm. Second, the sensor is insensitive to permanent or fluctuating magnetic fields. Third, the sensor is co-located with the actuator geometry. Fourth, the sensor uses the actuator windings for sensor coils and therefore requires no extra volume. Fifth, the sensor is insensitive to motions in the z axis, thus allowing for a variable air gap in the actuator.

The non-contact sensor according to the present claimed invention employs existing actuator geometry and windings to perform its function, while not requiring significant extra volume for the sensor.

While a preferred embodiment of the present invention has been set forth above, those skilled in the art who have reviewed the present disclosure will readily appreciate that other embodiments can be realized within the scope of the present invention. For example, any or all of the blocks shown in FIG. 2 can be implemented in many ways. There are many different ways to implement buffer circuits, adder circuits, comparator circuits, current amplifiers to drive motors, differential amplifiers, demodulator circuits, and analog switches. Also, the present invention can be implemented as a position sensor only with no actuator capability. Another embodiment of this invention can use a square wave, a triangular wave, or any other suitable wave in place of the twenty-kilohertz (or other frequency) sinusoidal excitation signal which goes to the winding on the permanent magnet.

We claim:

1. A position sensor for sensing a position of an armature in an actuator, the armature having at least one armature winding, the position sensor comprising:
   excitation wave generating means for generating an excitation wave;
   at least one sensor excitation winding for generating an excitation magnetic field from the excitation wave and for applying the excitation magnetic field to the at least one armature winding to cause the at least one armature winding to generate a response signal;
   detecting means, connected to the at least one armature winding, for detecting the response signal in the armature winding; and
   demodulating means for determining the position of the armature from the response signal detected by the detecting means, and at least one sensor winding having a first sensor excitation winding disposed above the armature and a second sensor excitation winding disposed below the armature the first and second sensor excitation windings causing z components of the response signal which cancel out so that the response signal is z-invariant.

2. A position controller for sensing and controlling a position of an armature in an actuator, the armature having at least one armature winding, the position controller comprising:
   excitation wave generating means for generating an excitation wave;
   at least one sensor excitation winding for generating an excitation magnetic field from the excitation wave and for applying the excitation magnetic field to the at least one armature winding to cause the at least one armature winding to generate a response signal;
   detecting means, connected to the at least one armature winding, for detecting the response signal in the armature winding;
   demodulating means for determining the position of the armature from the response signal detected by the detecting means to output a detected position signal; and
   position controlling means, receiving the detected position signal, for generating a position control signal and outputting the position control signal to the at least one armature winding.

3. A position controller as in claim 2, wherein:
   the actuator further comprises a magnetic bracket; and
   the at least one sensor excitation winding is disposed on the magnetic bracket.

4. A position controller as in claim 2, wherein the at least one sensor excitation winding comprises:
   a first sensor excitation winding disposed above the armature; and
   a second sensor excitation winding disposed below the armature;
   the first and second sensor excitation windings causing z components of the response signal which cancel out so that the response signal is z-invariant.

5. A position controller as in claim 2, wherein the detecting means comprises:
   a differential amplifier, receiving outputs from the at least one armature winding, for generating a differentially amplified armature output; and
   frequency filtering means, receiving the differentially amplified armature output, for frequency filtering the differentially amplified armature output to separate a desired frequency component from an undesired frequency component and for passing the desired frequency component as the response signal to the demodulating means.

6. A position controller for sensing and controlling a position of an armature in an actuator, wherein the armature has at least one armature winding, the position controller comprising:
   excitation wave generating means for generating an excitation wave;
   at least one sensor excitation winding for generating an excitation magnetic field from the excitation wave and for applying the excitation magnetic field to the at least one armature winding to cause the at least one armature winding to generate a response signal;
   detecting means, which is connected to the at least one armature winding, for detecting the response signal in the armature winding;

demodulating means for determining the position of the armature from the response signal detected by the detected means to output a detected position signal; and position controlling means, receiving the detected position signal, for generating a position control signal and outputting the position control signal to the at least one armature winding;

wherein the position controlling means comprises:
    buffering means for buffering the detected position signal to produce a buffered position signal;
    PID compensating means for producing proportional, integral, and differential signals in response to the buffered position signal;
    adding means for adding the proportional, integral, and differential signals to produce an added signal; and
    current amplifying means for amplifying the added signal to produce the position control signal.

7. A position controller as in claim 6, wherein the position controlling means further comprises second adding means for adding a desired position signal to the buffered position signal, the desired position signal representing a desired position of the armature.

8. A position controller as in claim 7, wherein the second adding means is connected in series between the buffering means and the PID compensating means.

9. A position controller according to claim 6, wherein the detecting means comprises:

a differential amplifier, receiving outputs from the at least one armature winding, for generating a differentially amplified armature output; and frequency filtering means, receiving the differentially amplified armature output, for frequency filtering the differentially amplified armature output to separate a desired frequency component from an undesired frequency component and for passing the desired frequency component as the response signal to the demodulating means.

10. A position controller according to claim 9, wherein the at least one sensor excitation winding comprises:

a first sensor excitation winding disposed above the armature; and a second sensor excitation winding disposed below the armature;

the first and second sensor excitation windings causing z components of the response signal which cancel out so that the response signal is z-invariant.

11. A position controller according to claim 6, wherein:

the actuator further comprises a magnetic bracket; and the at least one sensor excitation winding is disposed on the magnetic bracket.

* * * * *